US009030782B2

(12) United States Patent
McKinlay et al.

(10) Patent No.: US 9,030,782 B2
(45) Date of Patent: May 12, 2015

(54) DATA READER SIDE SHIELDS WITH POLISH STOP

(71) Applicant: Seagate Technology LLC, Cupertino, CA (US)

(72) Inventors: Shaun Eric McKinlay, Eden Prairie, MN (US); Eric W. Singleton, Maple Plain, MN (US); Carolyn Pitcher Van Dorn, Crystal, MN (US); Levent Colak, Eden Prairie, MN (US); Thu-Van Thi Nguyen, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/800,222

(22) Filed: Mar. 13, 2013

(65) Prior Publication Data

US 2014/0268422 A1  Sep. 18, 2014

(51) Int. Cl.
*G11B 5/39* (2006.01)
*G11B 5/11* (2006.01)
*G11B 5/31* (2006.01)

(52) U.S. Cl.
CPC .............. *G11B 5/112* (2013.01); *G11B 5/3163* (2013.01); *G11B 5/3912* (2013.01)

(58) Field of Classification Search
CPC ............ G11B 5/10; G11B 5/11; G11B 5/112; G11B 5/3912

USPC ..................... 360/319, 324.11, 320
See application file for complete search history.

(56) References Cited

U.S. PATENT DOCUMENTS

| | | | |
|---|---|---|---|
| 7,024,756 B2 | 4/2006 | Le et al. | |
| 7,271,982 B2 | 9/2007 | MacDonald et al. | |
| 7,440,229 B2 | 10/2008 | Sasaki et al. | |
| 7,688,546 B1 | 3/2010 | Bai et al. | |
| 8,166,631 B1 | 5/2012 | Tran et al. | |
| 8,231,796 B1 | 7/2012 | Li et al. | |
| 2006/0067005 A1* | 3/2006 | Jayasekara | 360/319 |
| 2006/0256482 A1* | 11/2006 | Araki et al. | 360/319 |
| 2006/0279881 A1* | 12/2006 | Sato | 360/324.12 |
| 2007/0081279 A1* | 4/2007 | Hong et al. | 360/324.1 |
| 2011/0051291 A1* | 3/2011 | Miyauchi et al. | 360/319 |
| 2011/0279923 A1* | 11/2011 | Miyauchi et al. | 360/319 |
| 2012/0063034 A1* | 3/2012 | Hsu et al. | 360/319 |
| 2012/0087045 A1* | 4/2012 | Yanagisawa et al. | 360/319 |
| 2012/0087046 A1* | 4/2012 | Yanagisawa et al. | 360/319 |
| 2012/0250189 A1* | 10/2012 | Degawa et al. | 360/319 |
| 2012/0281319 A1* | 11/2012 | Singleton et al. | 360/319 |
| 2013/0308228 A1* | 11/2013 | Mashima et al. | 360/125.12 |
| 2014/0153137 A1* | 6/2014 | McKinlay et al. | 360/235.4 |
| 2014/0153138 A1* | 6/2014 | Le et al. | 360/319 |

* cited by examiner

*Primary Examiner* — Craig A. Renner
(74) *Attorney, Agent, or Firm* — Hall Estill Attorneys at Law

(57) ABSTRACT

A data reader and associated method of making are generally provided. A data reader capable of sensing adjacent data bits may be configured at least with a magnetic stack disposed between first and second side shields. Each side shield may have a polish stop layer that is tuned to provide a first predetermined polish rate.

18 Claims, 4 Drawing Sheets

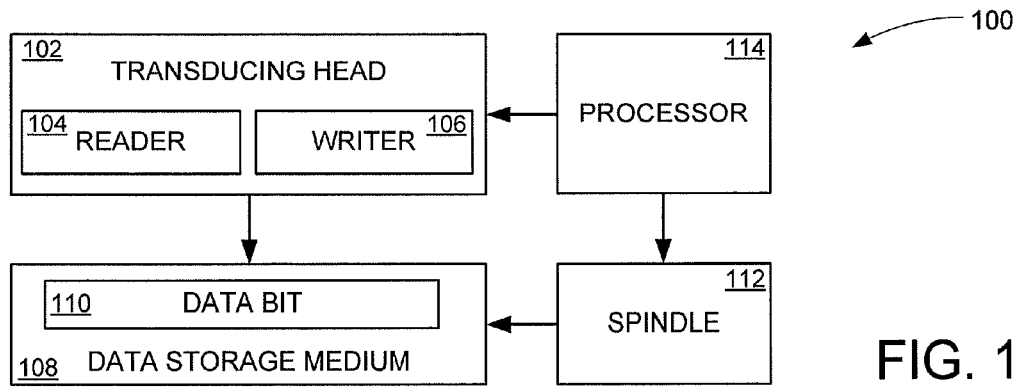
FIG. 1
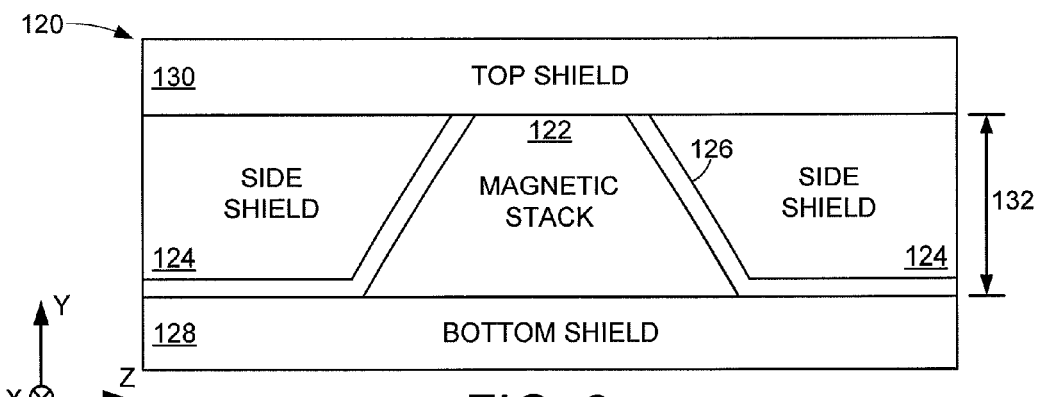
FIG. 2
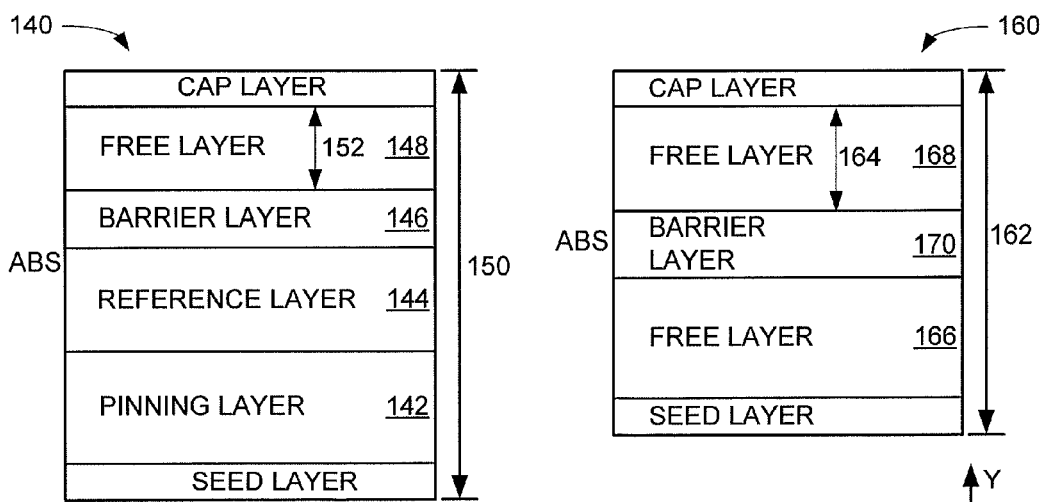
FIG. 3A
FIG. 3B

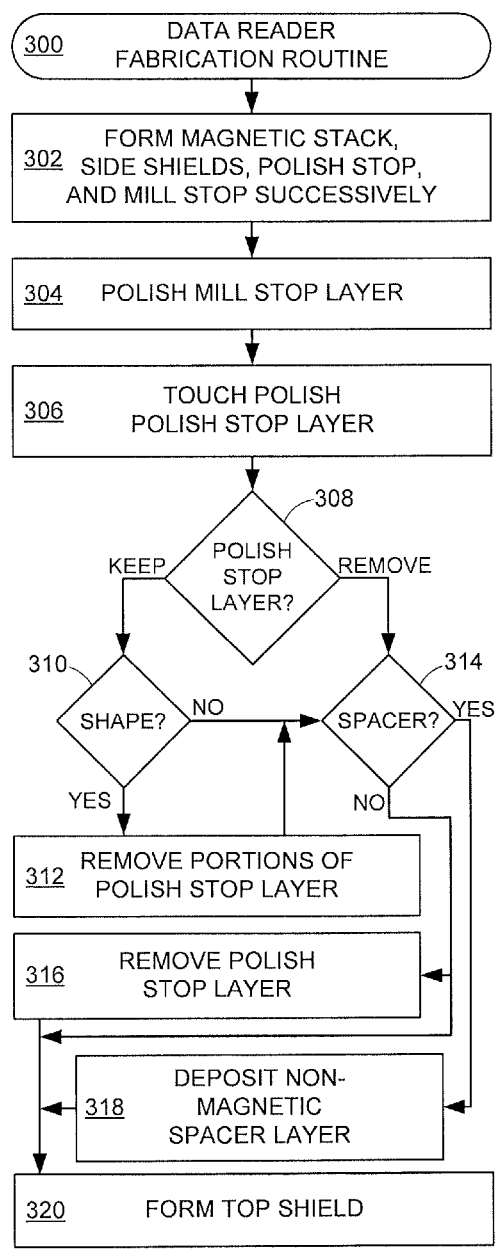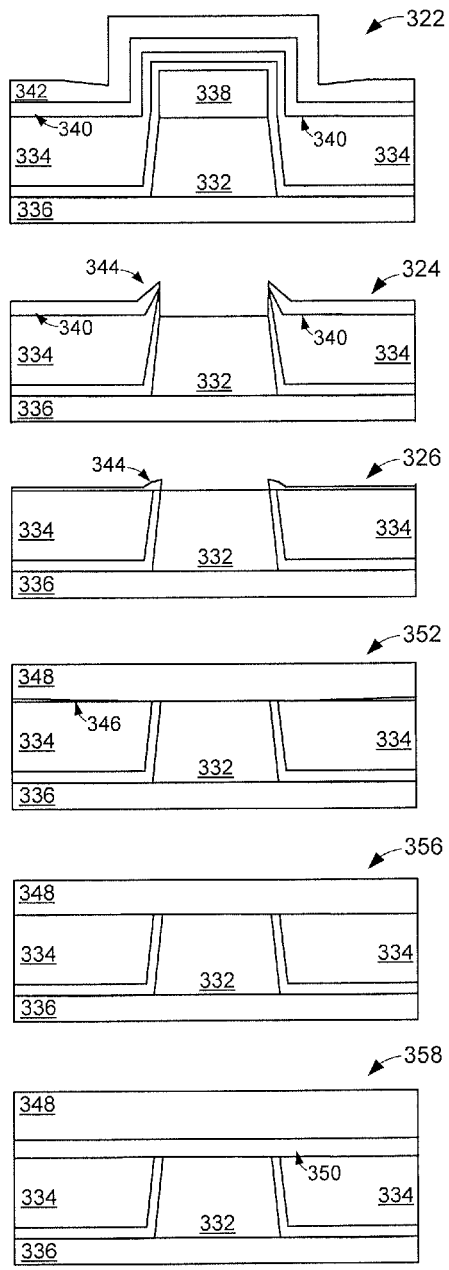
FIG. 8A                    FIG. 8B

DATA READER SIDE SHIELDS WITH POLISH STOP

SUMMARY

Various embodiments are generally directed to a data storage element capable of reading data bits in various data storage environments.

In accordance with some embodiments, a data reader may be configured at least with a magnetic stack disposed between first and second side shields. Each side shield may have a polish stop layer that is tuned to provide a first predetermined polish rate.

BRIEF DESCRIPTION OF THE DRAWINGS

FIG. 1 is a block representation of an example portion of a data storage device configured and operated in accordance with some embodiments.

FIG. 2 displays an ABS view block representation of a portion of an example data reader capable of being used in the data storage device of FIG. 1.

FIGS. 3A and 3B respectively show cross-sectional block representations of example magnetic stacks capable of being used in the data reader of FIG. 2.

FIGS. 8A and 8B respectively provide a flowchart and associated example data readers for a data reader fabrication routine carried out in accordance with various embodiments.

DETAILED DESCRIPTION

Figure 4:
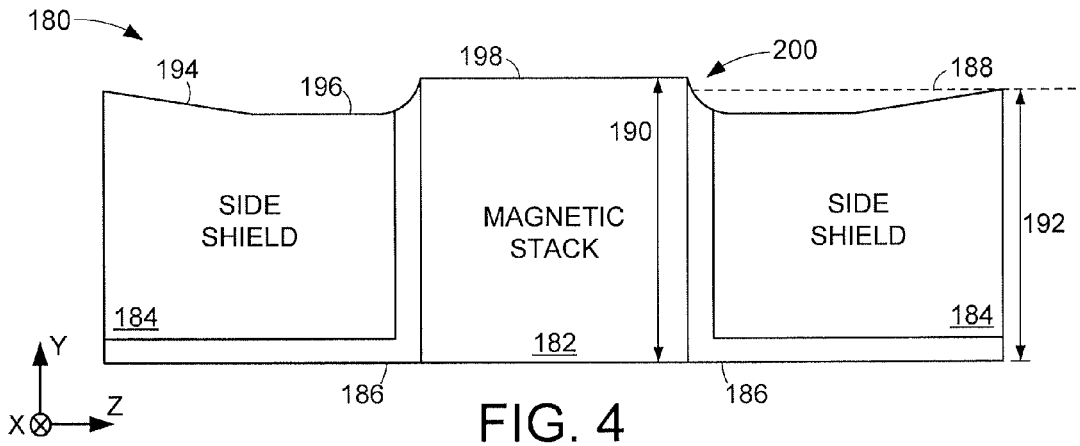
FIG. 4 shows an air bearing view block representation of a portion of an example data reader configured in accordance with some embodiments.

The continued emphasis on smaller form factors, faster access speeds, and greater data capacity has reduced data storage components to near physical limits. The corresponding increase in data bit density in rotating data storage devices has further emphasized magnetic shielding so that a single data bit may be sensed at a time. While both data readers and writers can employ laterally adjacent side shields, reader side shields can be considerably smaller in yet formed with deposition techniques having tolerances conducive to data writer shields. Such large deposition tolerances can jeopardize structure and magnetic operation of a data reader shield. Thus, data reader shield structure and formation techniques that are capable of creating more precise features are an ongoing goal of the data storage industry.

Accordingly, a data reader may be configured at least with a magnetic stack disposed between first and second side shields that each have a polish stop layer that is tuned to provide a first predetermined polish rate. The use of a tuned polish stop layer can protect the underlying side shields and allow deposition techniques with relatively large tolerances to be used to create precise reader shields. Tuning the polish stop layer for material and thickness may additionally provide a more planarized side shield top surface by reducing the polish rate of a chemical mechanical polish to minimize variation in the amount and location of material being removed by the polish.

FIG. 1 displays a block representation of an example data storage device 100 in which a polish stop and predetermined polish rate may be utilized in accordance with various embodiments. The data storage device 100 is shown in a non-limiting configuration where a transducing head 102 is equipped with a data reader 104 and data writer 106 that can respectively be positioned over a variety of locations on a magnetic storage medium 108, such as over one or more stored data bits 110. The storage medium 108 can be attached to one or more spindle motors 112 that rotate the medium 108 to produce an air bearing surface (ABS) on which the transducing head 104 flies to access predetermined portion of the medium 108. In this way, one or more local or remote processors 114 can provide controlled motion of the spindle 112 to adjust and align the reader 104 and writer 106 with selected data bits 110.

While a consolidation of data bits 110 on the data storage medium 108 can provide greater data capacity, defining a magnetic extent of the data reader 104 and writer 106 has becoming increasingly difficult as the physical size of magnetic shields are decreased to a nanometer scale and beyond. FIG. 2 provides an air bearing view of a block representation of a portion of an example data reader 120 capable of being used in the transducing head 102 of FIG. 1. The data reader 120 is configured with a magnetic stack 122 having a substantially trapezoidal shape and disposed between side shields 124 that each have stack sidewalls 126 angled to be parallel with the trapezoidal shape of the magnetic stack. The shaped side shields 124 can complement the bottom 128 and top 130 to define a magnetic extent of the magnetic stack 122 in which data bits can be sensed.

However, reduction in amount of non-magnetic material between the magnetic stack 122 and side shields 124 in an effort to reduce the shield-to-shield spacing 132 can inadvertently allow magnetic shunting, noise, and signal loss in the data reader 120 that degrades the sensing of data bits. Such minimization of the data reader 120 can further be exacerbated by increased magnetic strength of the shields 124, 128, and 130 that can be susceptible to slight fluctuations in construction. That is, the tight tolerances of the data reader 120 components can be volatile due at least to magnetic characteristics like anisotropy, saturation, and coercivity that can vary with minor fabrication variances.

The potential magnetic volatility of the data reader 120 can, in some embodiments, be combated by the tuned configuration of the magnetic stack 120 to provide a more stable data sensing magnetic mechanism. FIGS. 3A and 3B respectively display cross-sections of example magnetic stacks 140 and 160 that can be tuned and utilized in the data reader 120 of FIG. 2. It should be noted that the term "stack" is an unlimited term within this disclosure that can be one or more vertically and horizontally aligned layers, constructed of magnetic and non-magnetic material that are capable of magnetic reading and writing. Throughout the present application, the term "stack" will be understood to mean a component that is constructed to respond to external data bits. For example, but not in any way limiting, a magnetic stack may be a data reader that can differentiate between a plurality of data bits.

In FIG. 3A an abutted junction magnetic stack 140 is shown with a fixed magnetization pinning layer 142 contacting a fixed magnetization reference layer 144 opposite a non-magnetic barrier layer 146 from a magnetically free layer 148. As the free layer 148 responds to an external data bit while the reference layer 144 maintains a fixed magnetization due to the exchange coupling with the pinning layer 142, an external data bit can be read as a logic state. Construction of the abutted junction magnetic stack 140 can have a shield-to-shield spacing 150 and free layer thickness 152 that reduces possible data track resolution. However, the inclusion of the reference 144 and pinning 142 layers can correspond to a smaller free layer thickness 152, increased shield-to-shield spacing 150, and reduced magnetoresistive ratio between the free 148 and reference 144 layers.

In contrast, the trilayer stack 160 of FIG. 3B may be used to read data bits with a reduced shield-to-shield spacing 162 and greater free layer thickness 164 compared to the abutted junction stack 140. In operation, the trilayer stack 160 has first 166 and second 168 magnetically free layers that are separated by a barrier layer 170 and set to default magnetizations by biasing structures external to the trilayer stack 160. The relocation of any fixed magnetization structures from the stack 160 to elsewhere allow for the reduced physical size 162 compared to the fixed magnetization having abutted junction stack 140. However, the lack of any fixed magnetization in the trilayer stack 160 can be difficult to bias properly to read data from densely packed data bits, especially with strong magnetic shields in close physical proximity.

Despite heightened stability and sensitivity provided by the tuned magnetic stacks 140 and 160, variations in magnetic shield construction can jeopardize data bit reading performance. FIG. 4 illustrates an air bearing view block representation of a portion of an example data reader 180 under construction. As shown, the data reader 180 has a magnetic stack 182 disposed between magnetic side shields 184 and separated from each side shield 184 by a non-magnetic insulation layer 186. Various embodiments may configure the side shields 184 as single solid layers of material, such as NiFe and CoFe, or as a lamination of multiple different materials, such as alternating magnetic and non-magnetic metals, which can tune the magnetic characteristics of the side shields and the performance of the magnetic stack 182.

Regardless of how the side shields 184 are configured, the reduction in physical size of the data reader 180 has increased the magnetic volatility resulting from variations in material deposition. Variations may be present in a diverse variety of forms, such as the non-uniform top surface topography characterized by the deviation from a predetermined plane 188. That is, the magnetic stack 182 may have a greater thickness 190 along the Y axis that the predetermined plane thickness 192 while the side shield top surfaces 194 each have depressions 196 that steeply undulate to the magnetic stack top surface 198 via sidewalls 200. The origins of the top surface variations in the data reader 180 may be from one or more deposition and processing steps, but can nevertheless be problematic for subsequent top shield deposition, inter-shield coupling, and shield magnetic performance that all corresponds to degraded magnetic stack 182 performance.

Figure 5A:
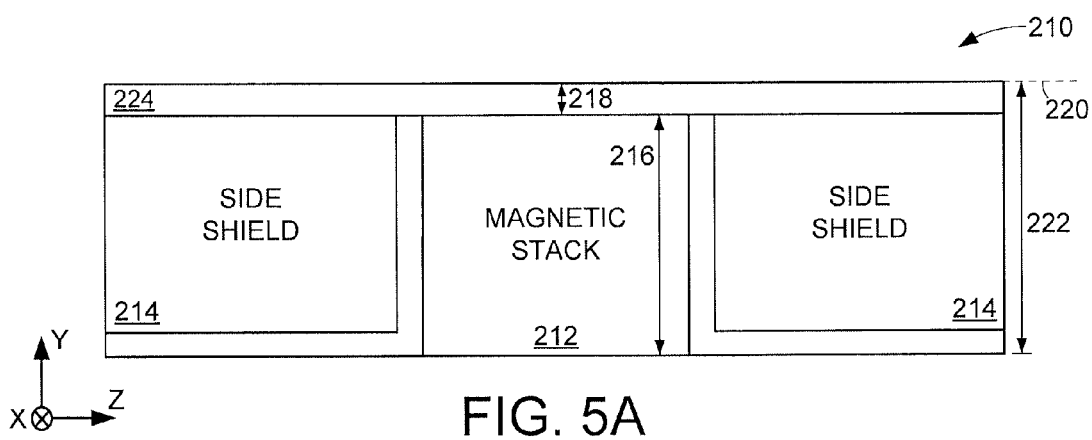
FIGS. 5A, 5B, and 5C respectively illustrate air bearing view block representations of an example data reader constructed in accordance with various embodiments.
Figure 5B:
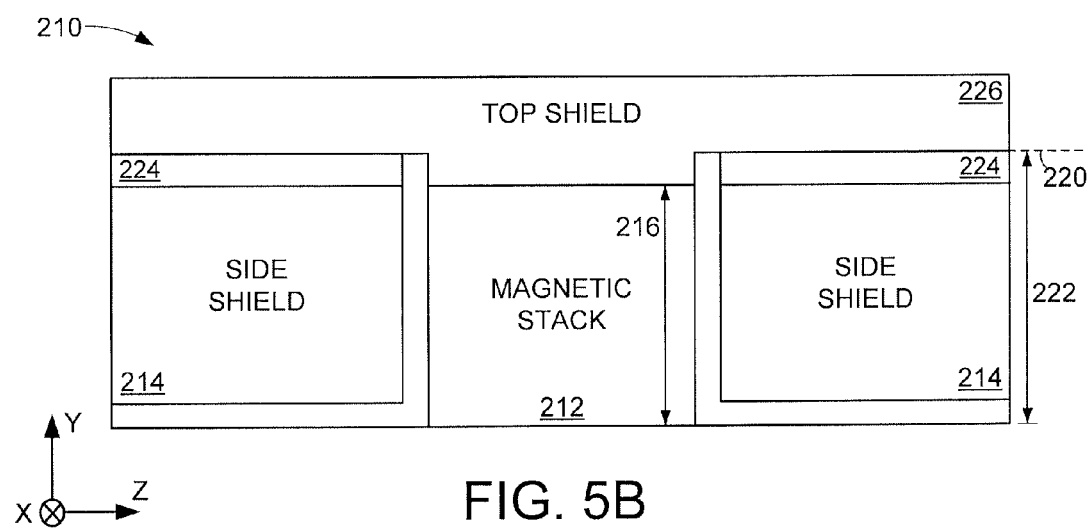
Figure 5C:
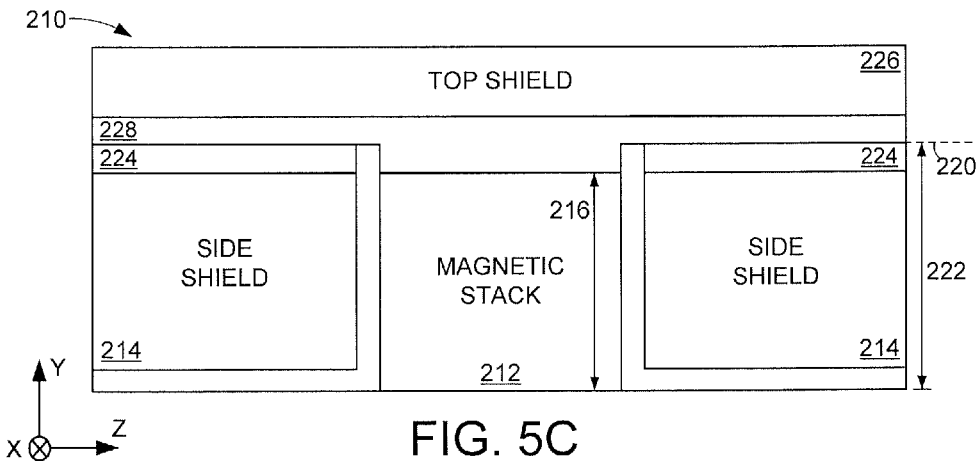

FIGS. 5A, 5B, and 5C respectively illustrate air bearing view block representations of an example data reader 210 tuned to mitigate the presence of surface variations like those shown in FIG. 4. FIG. 5A displays a magnetic stack 212 positioned between side shields 214 and configured with a uniform thickness 216 along the Y axis that continuously extends along the Z axis to each side shield 214 at a distance 218 from a top surface plane 220. As such, the difference in distance 218 between the magnetic stack thickness 216 and top surface thickness 222 is filled by a polish stop layer 224.

The addition and placement of the polish stop layer 224 atop the side shields 214 and magnetic stack 212 during fabrication can minimize the chance of top surface variations as the polish stop layer 224 serves to protect the magnetic stack and side shield top surfaces. While the polish stop layer 224 may be constructed with an unlimited variety of materials, various embodiments tune the material of the polish stop layer 224 to be a material with inherently low polish rates, which minimize the topography of surfaces subsequent to a polishing fabrication process. Materials such as, but not limited to, metals like platinum, ruthenium, iridium, rhodium that have high mass and low reactivity, can be utilized just as titanium and chromium as well as alloys of chromium, nickel, and cobalt to provide a predetermined polish rate of 0.2-3 nm/min due to the inherent reactive chemistry of the material that decreases the chances excess material will be removed during a polishing manufacture operation.

The polish stop layer 224 may be incorporated into the side shields 214 as part of a finalized data reader to further protect the structural integrity of the side shield material during processing and formation of a top shield 226. Portions of the polish stop layer 224 may also be removed, as shown by FIG. 5B, to allow the top shield 226 to come into direct contact with the magnetic stack 212, which can ensure electrical conductivity from the top shield 226 through the magnetic stack 212 instead of through the side shields 214. However, FIG. 5C displays how direct contact of the magnetic stack 212 and top shield 226 may conversely be separated by a non-magnetic spacer layer 228 that continuously extends along the Z axis, parallel to the air bearing surface (ABS), from one side shield 214 to the other to reduce any possible shunting between the side 214 and top 226 shields.

As provided in the top shield 226 configurations of FIGS. 5B and 5C, a data reader 210 can be tuned to incorporate the material of the polish stop layer 224 into the side shields 214. However, such polish stop layer 224 incorporation may inhibit coupling between the side 214 and top 226 shields that can, in some embodiments, be used to optimize magnetic shielding and magnetic stack 252 performance. Accordingly, the polish stop layer 224 can be tuned for material to ensure that the layer 224 can be removed through etching and milling operations without damaging the minimal topography of the side shield 214 and magnetic stack 212 top surfaces.

Figure 6:
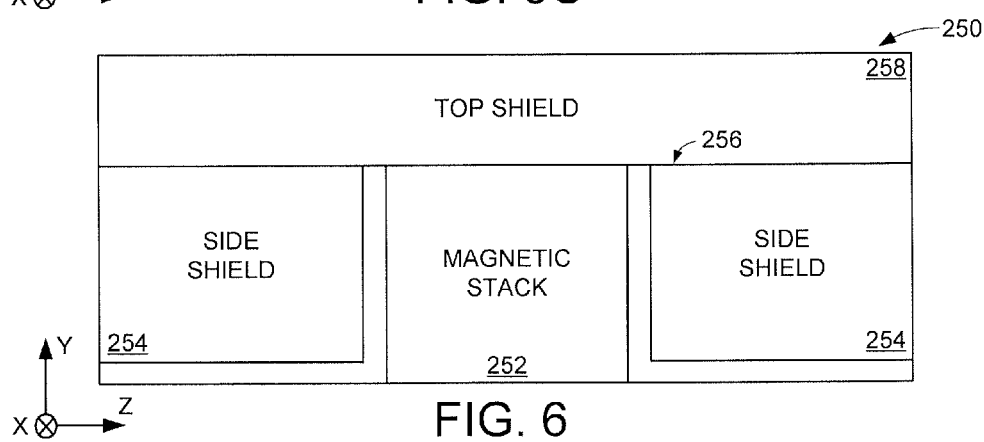
FIG. 6 displays an air bearing view block representation of a portion of an example data reader configured in accordance with some embodiments.

FIG. 6 provides an air bearing view block representation of an example data reader 250 that has a magnetic stack 252 and side shields 254 that share a top surface 256 with minimal topography due to a polish stop layer that was removed prior to the formation of a top shield 258. The removal of a polish stop layer entirely can allow, as displayed, the continual contact of the top shield 258 with the side shields 254 and magnetic stack 252, which can correspond to predetermined magnetic coupling and interactions between the shields 254 and 258 that optimize magnetic stack 252 performance.

Figure 7:
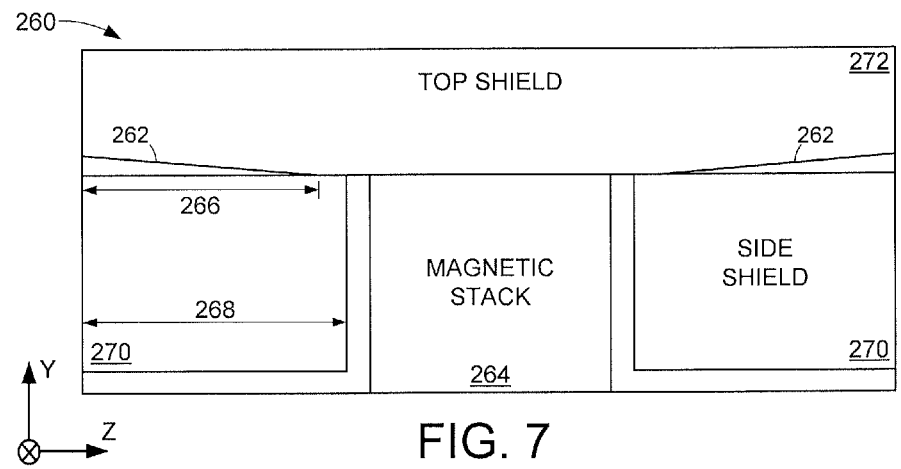
FIG. 7 is an air bearing view block representation of a portion of an example data reader tuned in accordance with various embodiments.

The tuning possibilities with the polish stop layer 224 are not limited to complete incorporation, as shown in FIGS. 5B and 5C, or complete removal, as shown in FIG. 6. FIG. 7 illustrates an example data reader 260 that utilizes shaped polish stop layers 262 in accordance with various embodiments to control shield coupling while mitigating electrical shunting. While not required or limiting, the polish stop layer 262 can be configured in a substantially triangular or rectangular shapes that continuously extends from a plane distal the magnetic stack 264 a distance 266 that is smaller than the width 268 of the side shield 270, as measured along the Z axis from the same distal plane to a magnetic stack 264 facing sidewall. Through the tuned shape of the polish stop layers 262, less than all the side shield 270 contacts the top shield 272 while the polish stop layer 262 shape provides a buffer between predetermined portions of the shields 270 and 272.

As generally illustrated in FIG. 5A through FIG. 7, the inclusion of a tuned polish stop layer can concurrently protect the top surface of side shields and provide a contact buffer between side and top shields. The tuning of such a polish top layer may be carried out in an unlimited variety of manners, but various embodiments follow the example data reader fabrication routine 300 of FIGS. 8A and 8B. In the embodiment shown in FIG. 8A, step 302 begins by successively forming a magnetic stack, side shields, polish stop layer, and mill stop layer. It can be appreciated that the various components formed in step 302 can be individually or collectively deposited and tuned to provide predetermined sizes, orientations, and materials. For instance, a trilayer magnetic stack may be separated from side shield laminations of magnetic and non-magnetic sub-layers by a non-magnetic insulating layer of predetermined thickness.

The example reader lamination 322 of FIG. 8B corresponds to step 302 and displays magnetic stack 332 separated from magnetic side shields 334 by an insulating layer on a bottom shield 336. The example data reader 322 also has a hard mask 338, such as an amorphous carbon mask, atop and aligned with the magnetic stack 332 while polish stop 340 and mill stop 342 layers are deposited to each continuously cover the side shields 334 and magnetic stack 332. With the polish stop layer 340 protecting the side shields 334 and the mill stop layer 342 protecting the polish stop layer 340, variations in shield-to-shield spacing can be minimized by reducing processing time needed to remove the polish stop layer 340. Various embodiments configure the mill stop layer 342 with material having a higher inherent polishing rate than the polish stop layer 340 to ensure the mill stop layer 342 will be completely removed during polishing operations conducted during construction.

Next, step 304 removes the mill stop layer 342 with a polishing operation having a high polish rate, such as 10-40 nm/min. Prior to the polishing operation of step 304, some embodiments conduct a knock-off milling operation with a non-normal angle of incidence, like 80°. Data reader 324 illustrates how material selection of the mill stop layer 342 and polishing rate of step 304 can result in the polish stop layer 340 being resident atop the side shields 334 while the magnetic stack 332 is exposed subsequent to a plasma etch of the hard mask 338. As described above, a high polishing rate can be imprecise and produce an elevated ring 344 that may result in volatile and altered side shield 334 performance.

The elevated ring 344 may then be polished with a more precise, lower polishing rate in step 306 characterized as a "touch" polishing due to decreased duration and speed that minimizes the topography of the polish stop layer 340, as shown by data reader 326 of FIG. 8B. Minimization of the topography of the polish stop layer 340 leads to decision 308 where a determination of whether or not to retain the presence of the polish stop layer is conducted. If the polish stop layer is to be kept, decision 310 determines if the layer is to be shaped, which can lead to step 312 where a predetermined shape, such as a triangle, rectangle, or aspects of both, are formed by removing some, but not all, of the polish stop layer 340. Example data reader 352 displays a triangular polish stop layer shape 346 that has been configured to extend across some, but not all, the width of the side shields 334.

Regardless of whether or not the polish stop layer is shaped or not or whether the polish stop layer 340 is to be removed as a result of decision 308, decision 314 can evaluate if a non-magnetic spacer is to be formed atop the side shields 334 or polish stop layer 340. A determination that no spacer and no polish layer are to be formed from decisions 308 and 314 advances to step 316 and the removal of the polish stop layer 340, which corresponds to data reader 356 of FIG. 8B. A decision to include a non-magnetic spacer from decision 314 subsequently has step 318 deposit a non-magnetic spacer over a polish stop layer 340 or over the side shields 334.

In other words, a determination from decision 314 to include the polish stop layer from decision 308 without a non-magnetic spacer proceeds to step 320 where the top shield is formed while a determination from decisions 308 and 314 to remove the polish stop layer and not deposit a spacer advances straight to step 320 by bypassing step 316, as shown in FIG. 3A. Example data reader 358 corresponds with the top shield formation of step 320 where a non-magnetic spacer layer 350 is disposed between the top shield 348 and the side shields 334 along with the magnetic stack 332, which follows a decision to remove the polish stop layer and form a spacer layer prior to step 320.

The tuned incorporation of a polish stop layer with a predetermined polish rate can protect the underlying side shields from topography variations due to high polishing rate operations. The further inclusion of a mill stop layer atop the polish stop layer may provide additional protection for the side shields as the higher polish rate of the mill stop layer ensures the polish stop layer is present after any polishing operations on the mill stop layer. The ability to tune the polish stop layer for shape and material along with the possible formation of a non-magnetic spacer layer between the side shields and top shield may allow controlled interaction between the shields that corresponds with optimized performance of the magnetic stack.

While the embodiments herein have been directed to magnetic sensing, it will be appreciated that the technology described above can readily be utilized in any number of other applications, including data writing. It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a magnetic stack disposed between first and second side shields, each side shield having a shield width proximal a top plane on an air bearing surface (ABS), the shield width measured parallel to the ABS and perpendicular to a shield thickness, each side shield comprising a polish stop layer having the shield width and tuned to provide a first predetermined polish rate of approximately 0.2 nm/min, a non-magnetic layer with a first thickness on the ABS that contacts the magnetic stack and a second thickness on the ABS that contacts the respective polish stop layers, the first thickness being greater than the second thickness and measured perpendicular to the shield width.

2. The apparatus of claim 1, wherein the magnetic stack comprises an abutted junction lamination with a fixed magnetization providing pinning layer.

3. The apparatus of claim 1, wherein the magnetic stack comprises a trilayer lamination without a fixed magnetization providing layer.

4. The apparatus of claim 1, wherein at least one side shield is a lamination of multiple different materials.

5. The apparatus of claim 1, wherein at least one side shield comprises a single continuous material.

6. The apparatus of claim 1, wherein the polish stop layer comprises a non-magnetic metal.

7. The apparatus of claim 1, wherein the polish stop layer comprises a non-magnetic metal alloy.

8. The apparatus of claim 1, wherein the first side shield continuously extends for a first distance on the ABS, the polish stop layer continuously extending along the ABS a second distance, the first distance being greater than the second distance.

9. The apparatus of claim 1, wherein the polish stop layer is disposed between each side shield and a top shield.

10. The apparatus of claim 9, wherein the non-magnetic layer continuously extends from adjacent the first side shield to adjacent the second side shield between the polish stop layer and the top shield.

11. A method comprising:
forming a magnetic stack between first and second side shields;
configuring each side shield with a polish stop layer, the polish stop layer tuned to provide a first predetermined polish rate of approximately 0.2 nm/min, each side shield having a shield width proximal a top plane on an air bearing surface (ABS), the shield width measured parallel to the ABS and perpendicular to a shield thickness, each polish stop layer having the shield width; and
depositing a non-magnetic layer contacting each polish stop layer and the magnetic stack, the non-magnetic layer having a first thickness on the ABS contacting the magnetic stack and a second thickness on the ABS contacting the respective polish stop layers, the first thickness being greater than the second thickness and measured perpendicular to the shield width.

12. The method of claim 11, wherein the polish stop layer is deposited with a non-normal incidence angle.

13. The method of claim 11, wherein multiple polishing operations are conducted subsequent to the configuring of each side shield.

14. The method of claim 13, wherein a first polishing operation removes a mill stop layer with a second predetermined polish rate, different from the first predetermined polish rate, and a second polishing operation minimizes topography of the polish stop layer.

15. An apparatus comprising a magnetic stack disposed between first and second side shields, each side shield separated from the magnetic stack by an insulating material and having a shield width proximal a top plane on an air bearing surface (ABS), the shield width measured parallel to the ABS and perpendicular to a shield thickness, each side shield comprising a polish stop layer having the shield width and tuned to provide a predetermined polish rate of approximately 0.2 nm/min, a non-magnetic layer continuously extending from adjacent the first side shield to adjacent the second side shield with a first thickness on the ABS that contacts the magnetic stack and a second thickness on the ABS that contacts each polish stop layer, the first thickness being greater than the second thickness and measured perpendicular to the shield width, the insulating material comprising a different material than each polish stop layer and the non-magnetic layer.

16. The apparatus of claim 15, wherein the non-magnetic layer separates each polish stop layer from a shield layer.

17. The apparatus of claim 15, wherein the first thickness spans the top plane, the top plane aligned with a top surface of each polish stop layer, the top plane separated from the magnetic stack.

18. The apparatus of claim 15, wherein the magnetic stack has a stack width on the ABS proximal the top plane, the second thickness extending for the stack width on the ABS.

* * * * *